United States Patent Office 3,535,929
Patented Oct. 27, 1970

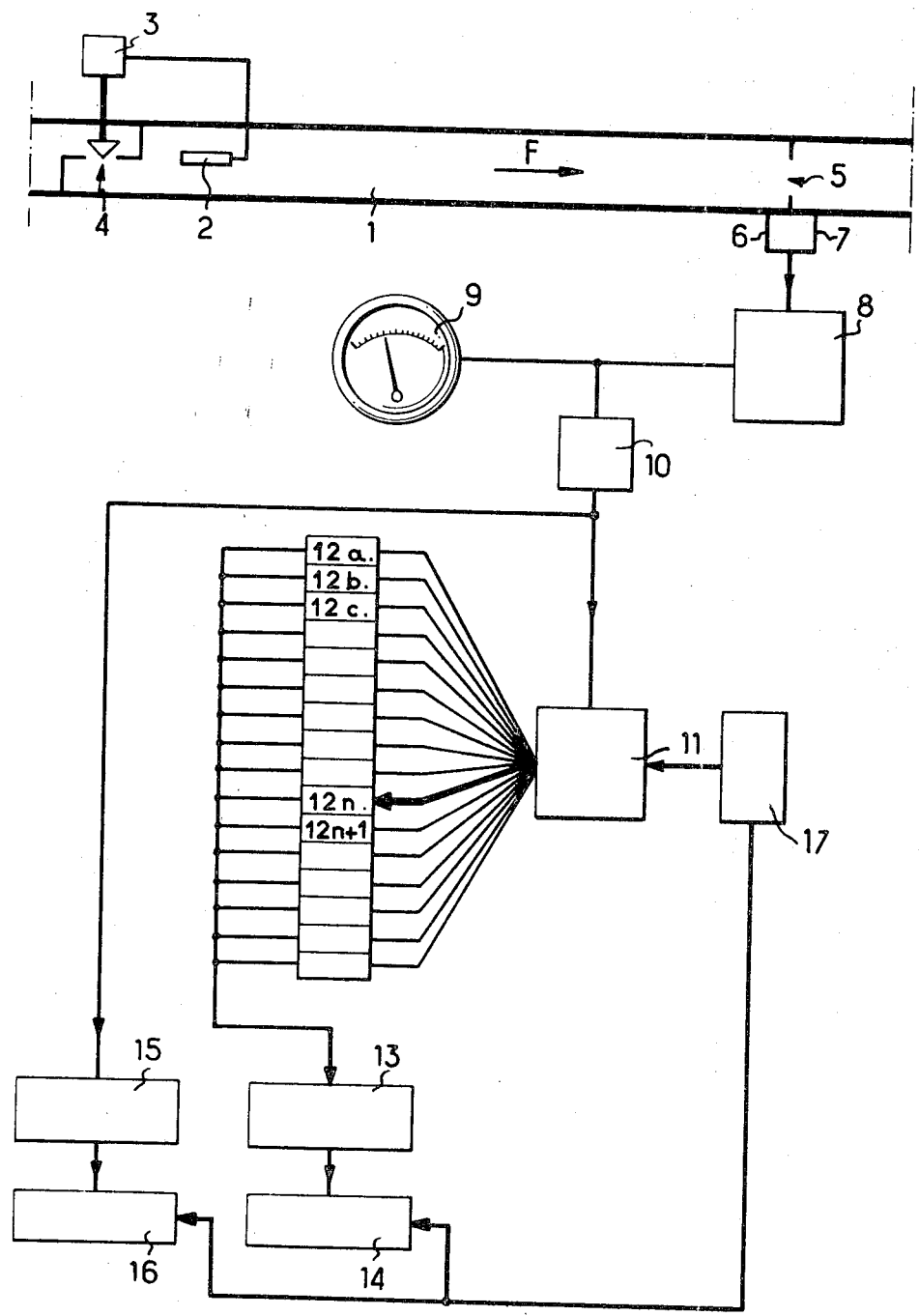

1

3,535,929
METHOD AND APPARATUS FOR THE SIMULTANEOUS DETERMINATION OF FLUID FLOW OVER A LONG AND A SHORT TIME INTERVAL
Lucien Mondeil, Lescar, and Marc Fontimpe, Pau, France, assignors to Societe Anonyme dite: Societe Nationale des Petroles d'Aquitaine
Filed July 12, 1967, Ser. No. 652,756
Claims priority, application France, Aug. 5, 1966, 72,250
Int. Cl. G01f 1/00
U.S. Cl. 73—206     3 Claims

ABSTRACT OF THE DISCLOSURE

Device for determining the quantity of fluid delivered by a pipeline over a given period of time, said device comprising a flowmeter which provides a current proportional to the instantaneous volume of flow in the pipeline, a current-to-frequency converter for transforming an electrical value furnished by the flowmeter into pulses having a frequency proportional to this value, a group of storage devices and a timing device for successively switching the pulses coming from the converter to each of the storage devices and an adder-subtractor connected to each of the storage devices for totaling the number of pulses recorded in the storage devices on order of the timing device, as well as subtracting the number of pulses recorded in each storage device.

---

The present invention relates to a process for determining at regular intervals the quantity of fluid delivered by a pipeline over a period of time which is usually substantially greater than that between two successive determinations.

This process makes it possible to measure the average values of the quantities of fluid supplied by the pipeline.

Such a method of measuring the volume of flow is particularly useful in the case of gas lines, in which the volume of flow is subject to relatively large sudden variations, and to moderate variations, which it is equally necessary to detect, because the conditions of sale of gases are often based on average volumes of flow over a predetermined time.

It is an object of the present invention to provide a method of determining at regular intervals the quantity of fluid supplied by a pipeline over a given time, this method being essentially characterized by the fact that it makes use of an electric indication proportional to the instantaneous volume of flow of the fluid, which signal is transformed, if necessary, into electric pulses, which pulses have a frequency directly proportional to the instantaneous volume of flow. These pulses are simultaneously supplied to an adder and a memory bank, through means controlled by a timing device which directs said pulses successively into the individual storage devices composing the bank over predetermined intervals of time. The total number of pulses stored in all the storage devices is then recorded. Said device, when it directs the pulses toward a new storage device, causes the number of pulses already stored in the new storage device to be rapidly subtracted from the number of pulses already stored in the adder and in the memory bank and resets the new storage device to zero before introducing the first pulse of a new sequence thereinto. The total number of pulses stored in the memory bank or in the adder is recorded at the instant the timer switches the pulse train to a new storage device and before the number of pulses previously stored in the new storage device has been subtracted.

A particularly advantageous embodiment of the invention employs a converter which transforms an electrical value into a pulse train the frequency of which is proportional to the value being measured.

In an embodiment of the invention particularly adapted to the measurement of gas flow, the instantaneous volume of flow in a pipeline is obtained by measuring the pressure drop produced by a pressure-reducing device upstream of which there is positioned a conventional device for automatically maintaining the mass per unit volume at a constant value.

In a particular embodiment of the invention a bank of sixteen storage devices is used, and the timing device is set to direct the pulses to a new storage device every quarter of an hour.

Consequently every fifteen minutes the quantity of fluid supplied by the pipeline during the preceding quarter-hour is measured.

Another object of the preceding invention is to provide the devices needed to carry out the above described process.

In order that the invention may be better understood one specific embodiment thereof will now be described, purely by way of illustration and example, with reference to the accompanying drawing.

Pipeline 1, inside which a gas circulates in the direction of the arrow F, is shown on this drawing.

At the left of the pipeline is a capsule 2 into which a fluid of a given mass per unit volume has been previously introduced. This capsule is connected to one of the branches of a device (not shown) for measuring pressure differential, the second branch of which is connected to pipeline 1. This device acts as a zero indicator and any unbalance acts through a servo-control 3 to move the valve 4 so that the mass per unit volume remains constant downstream of this device in spite of the possible variations in the rate of flow.

Such a device for regulating the mass per unit volume has already been disclosed in U.S. Patent application Ser. No. 630,344, filed Apr. 12, 1967, by the Societe Nationale du Gaz du Sud-oest, the assignee of the present application.

On the right-hand side of the figure is shown a pressure reducing device 5 as well as two pressure transmitting devices 6 and 7 situated one on either side of the device 5, which is located a certain distance downstream of valve 4, for example at more than fifty meters, so as to avoid its being influenced by the movements of the device for stabilizing the mass per unit volume.

A device 8 produces an electric current the voltage of which is proportional to the square root of the pressure difference between points 6 and 7, so that the device 8 feeds to the flowmeter 9 a current which is directly proportional to the instantaneous volume of flow of pipeline 1.

Flowmeter 9 as shown may comprise a dial and needle from which the instantaneous volume of flow may be read directly, or it may be a recording or printing device.

The current proportional to the volume of flow is introduced into current-to-frequency converter 10 which is a device capable of converting it into pulses whose frequency is directly proportional to the current received.

If necessary, a divider permitting the passage of only a constant fraction of the pulses sent to it may be associated with this converter.

The pulses from converter 10 are fed to a switch 11 controlled by a timing device 17 which carries out a certain number of operations which will be explained below.

Switch 11 is connected to storage devices 12a, 12b, 12c . . . 12n, 12n+1 . . . connected in parallel to an adder 13.

In the present case, the storage devices 12a, 12b ... are 16 in number and the timing device 17 is so regulated that every 15 minutes pulses from the converter 10 are fed to a new storage device.

Adder 13 is connected to a printer 14 which is in turn controlled by timing device 17.

In order that the operation of this device may be explained, it is assumed that at a given instant all the storage devices are full and that the total number of pulses contained in these storage devices corresponds to the gas supplied by the pipeline during the preceding 3¾ hours.

The timing device feeds the pulses it receives during ¼ hour to storage device 12n, these pulses being added to the preceding pulses in the adder 13.

At the end of this ¼ hour the timing device acts on device 14 to cause the printing of the number of pulses contained in added 13, this number of pulses corresponding to the gas supplied during the preceding fifteen minutes.

Next the timing device subtracts the contents of storage device 12n+1 from the total recorded by added 13, and immediately begins to direct the pulses reaching it from the converter 10 toward the new storage device 12n+1.

After ¼ hour, the process is repeated.

Therefore every ¼ hour printing device 14 displays the quantity of gas supplied by the pipeline during the four preceding hours.

Of course, the storage devices toward which the switch successively directs pulses are taken in the chronological order in which they have previously been filled.

The embodiment shown may comprise another register 15 connected to a printing device 16 to determine the cumulative quantity of the gas supplied from any given instant.

In that case the pulses leaving converter 10 are also directed to register 15 which adds them, while the printing of the number displayed by the register 15 is controlled for example every ¼ hour, by timing device 17 which is also connected to printing device 16.

It is thus easy to display the instantaneous volume of flow of the fluid in pipeline 1, and to print every ¼ hour both the quantity supplied during the preceding four hours and the quantity supplied since a given instant.

What is claimed is:

1. Method of measuring over regular intervals of time the quantity of liquid flowing through a passageway during a period of time which is equal to a multiple of one of said intervals, which method comprises the following steps:
    (a) constantly measuring the volume of liquid flowing through said passageway;
    (b) generating electrical pulses the frequency of which is proportional to the instantaneous volume of flow of said fluid;
    (c) storing the number of pulses generated during each interval of time forming part of said period of time;
    (d) adding the number of pulses stored during each interval of time at the end of that interval to the total previously stored during said period of time; and
    (e) subtracting from this total, at the beginning of each interval, the number of pulses stored during the interval which immediately preceded the beginning of the period the end of which coincides with the end of the current interval.

2. Device for measuring at regular intervals of time the quantity of fluid flowing through a passageway during a given period of time which is a multiple of one of said intervals, said device comprising:
    (a) a flowmeter for constantly measuring the instantaneous volume of flow in said passageway and supplying an indication thereof in the form of an electric current;
    (b) means associated with said flowmeter to transform said current into pulses, the frequency of which is proportional to the volume of flow;
    (c) a series of memory stores, equal in number to the number of intervals in the period;
    (d) means comprising a timing device for directing said pulses successively to said memory stores, so that the pulses during any given interval are directed to a single memory, and each memory receives pulses only during a single interval; and
    (e) a counter associated with said clock for adding the pulses of all the memories and subtracting from this total the number of pulses stored during the interval preceding the beginning of the period during which measurement is taking place.

3. Device as claimed in claim 2 in which the flowmeter is a device responsive to pressure differences positioned downstream of a pressure regulating valve and responsive to the pressure in a capsule containing a predetermined mass of gas, whereby the pressure upstream of the valve varies with the pressure of the gas in the capsule, so that the mass per unit volume is kept constant.

References Cited
UNITED STATES PATENTS

| | | | |
|---|---|---|---|
| 2,826,068 | 3/1958 | Sperry | 73—194 |
| 2,851,882 | 9/1958 | Nottingham | 73—195 |

RICHARD C. QUEISSER, Primary Examiner

J. K. LUNSFORD, Assistant Examiner